(12) United States Patent
Hulinsky (10) Patent No.: US 11,021,362 B1
(45) Date of Patent: Jun. 1, 2021

(54) FUEL NOZZLE RETAINER KIT

(71) Applicant: Jeffrey Hulinsky, Sandy, UT (US)

(72) Inventor: Jeffrey Hulinsky, Sandy, UT (US)

( * ) Notice: Subject to any disclaimer, the term of this patent is extended or adjusted under 35 U.S.C. 154(b) by 0 days.

(21) Appl. No.: 16/683,861

(22) Filed: Nov. 14, 2019

(51) Int. Cl.
*B67D 7/42* (2010.01)
*B67D 7/06* (2010.01)
*F16L 3/14* (2006.01)
*B60R 11/00* (2006.01)
*B67D 7/04* (2010.01)

(52) U.S. Cl.
CPC ............ *B67D 7/42* (2013.01); *B60R 11/00* (2013.01); *B67D 7/06* (2013.01); *B67D 2007/0411* (2013.01); *F16L 3/14* (2013.01)

(58) Field of Classification Search
CPC . B60K 15/04; B67D 7/42; B67D 7/06; B67D 7/50; B67D 2007/0411; B67D 2007/0409; F17C 5/00; B63B 27/34; F16L 3/14; F16L 3/003; B60S 5/02; F16B 2/22; B60R 11/00; B60R 2011/004; B60R 2011/0059; B60R 2011/0075
USPC .................................................. 141/383, 392
See application file for complete search history.

(56) References Cited

U.S. PATENT DOCUMENTS

| | | | | |
|---|---|---|---|---|
| 544,631 A * | 8/1895 | Siver | .......................... | F16L 3/14 248/59 |
| 2,636,704 A * | 4/1953 | Norberg | ................... | F16L 3/003 248/79 |
| 3,050,801 A * | 8/1962 | Downey | ................ | F16L 37/008 285/244 |
| 3,220,680 A * | 11/1965 | Williams | ................ | F16L 3/003 248/79 |
| 3,291,165 A * | 12/1966 | Fraylick | ................. | B67D 7/421 141/286 |
| 4,214,614 A | 7/1980 | Pyle | | |
| 4,220,302 A | 9/1980 | Hampton | | |
| 4,537,437 A | 8/1985 | Buccola | | |
| 4,768,925 A | 9/1988 | Geupel | | |
| 5,899,249 A | 5/1999 | Armellino | | |
| 6,202,263 B1 * | 3/2001 | Harker | ....................... | B62J 7/08 114/230.2 |
| 6,962,177 B1 | 11/2005 | McCommons | | |
| 7,581,570 B1 * | 9/2009 | Lamke | ..................... | B67D 7/42 141/1 |
| 8,066,038 B2 * | 11/2011 | Jones | ....................... | B67D 7/42 141/383 |
| D657,134 S | 4/2012 | Tepper | | |
| 10,093,531 B1 * | 10/2018 | Allen | ..................... | B60R 11/00 |

(Continued)

FOREIGN PATENT DOCUMENTS

WO    WO2006014960    2/2006

*Primary Examiner* — Timothy P. Kelly
*Assistant Examiner* — Stephanie A Shrieves (57) ABSTRACT

A fuel nozzle retainer kit includes a first retainer that is attachable to a fuel tank that has a skirt thereon. The first retainer extends over a fill port on the fuel tank. Additionally, the first retainer has elastomeric properties to engage and thus retain a fuel nozzle in the fuel port. A second retainer is attachable to a fuel tank that does not have a skirt thereon. The second retainer has a first portion that is mountable around a fill port of the fuel tank that does not have a skirt. The second retainer has a second portion which is pivotally coupled to the first portion. Additionally, the second portion is positionable to engage a fuel nozzle inserted into the fill port to retain the fuel nozzle in the fill port.

9 Claims, 7 Drawing Sheets

(56) References Cited

U.S. PATENT DOCUMENTS

| | | | |
|---|---|---|---|
| RE47,927 E * | 4/2020 | Ragner | F16L 11/12 |
| 10,703,621 B1 * | 7/2020 | Vanston | B67D 7/04 |
| 10,759,651 B2 * | 9/2020 | Woods | B67D 7/42 |
| 2005/0039668 A1 * | 2/2005 | Sanford | B63B 21/00 |
| | | | 114/343 |

* cited by examiner

FUEL NOZZLE RETAINER KIT

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to fuel nozzle devices and more particularly pertains to a new fuel nozzle device for retaining a fuel nozzle in fuel tank during refueling.

(2) Description of Related Art Including Information Disclosed Under 37 CFR 1.97 and 1.98

The prior art relates to fuel nozzle devices. The prior art discloses a vapor seal that is positioned on a fuel nozzle to inhibit fuel vapors from exiting a fuel tank during refueling. The prior art also discloses a strap that is positionable around a breast feeding mother and a retainer coupled to the strap for engaging a feeding bottle. Additionally, the prior art discloses a pair of flanges that are mountable to a license plate of a vehicle when the fuel cap is located behind the license plate for restraining a fuel nozzle. In no instance does the prior art related to the patent search disclose a device that places tension on the fuel nozzle when the fuel nozzle is inserted into the fuel tank.

BRIEF SUMMARY OF THE INVENTION

An embodiment of the disclosure meets the needs presented above by generally comprising a first retainer that is attachable to a fuel tank that has a skirt thereon. The first retainer extends over a fill port on the fuel tank. Additionally, the first retainer has elastomeric properties to engage and thus retain a fuel nozzle in the fuel port. A second retainer is attachable to a fuel tank that does not have a skirt thereon. The second retainer has a first portion that is mountable around a fill port of the fuel tank that does not have a skirt. The second retainer has a second portion which is pivotally coupled to the first portion. Additionally, the second portion is positionable to engage a fuel nozzle inserted into the fill port to retain the fuel nozzle in the fill port.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 9 thereof, a new fuel nozzle device embodying the principles and concepts of an embodiment of the disclosure and generally designated by the reference numeral 10 will be described.

As best illustrated in FIGS. 1 through 9, the fuel nozzle retainer kit 10 generally comprises a first retainer 12 that is attachable to a fuel tank 14 that has a skirt 16 thereon. The fuel tank 14 may be a fuel tank on a semi tractor or any other cargo vehicle that is driven on public roads. The first retainer 12 extends over a fill port 18 on the fuel tank 14. Additionally, the first retainer 12 has elastomeric properties to engage and thusly retain a fuel nozzle 20 in the fuel port. The fuel nozzle 20 may be a fuel nozzle on a fuel pump at a refueling station or the like.

The first retainer 12 comprises a biasing member 22 that is attachable to a fuel tank 14 having the biasing member 22 extending over a fill port 18 on the fuel tank 14. In this way the biasing member 22 can be stretched over the fuel nozzle 20 that is inserted into the fill port 18. The biasing member 22 has a first end 24 and a second end 26. Additionally, the biasing member 22 may comprise a spring or the like.

The first retainer 12 includes a pair of couplers 28 that is each coupled to the biasing member 22. Each of the couplers 28 engages a skirt 16 on the fuel tank 14 thereby facilitating the biasing member 22 to be spaced outwardly from the fill port 18. The skirt 16 may be a skirt that is installed on the fuel tank 14 for aerodynamic purposes. Each of the couplers 28 is coupled to a respective one of the first end 24 and the second end 26 of the biasing member 22. Additionally, each of the couplers 28 engages the skirt 16 on the fuel tank 14 on opposite sides of a cutout 29 in the skirt 16 that facilitates access to the fill port 18. Each of the couplers 28 may comprise an eyebolt and a corresponding nut or any other type of releasable fastener.

Figure 1:
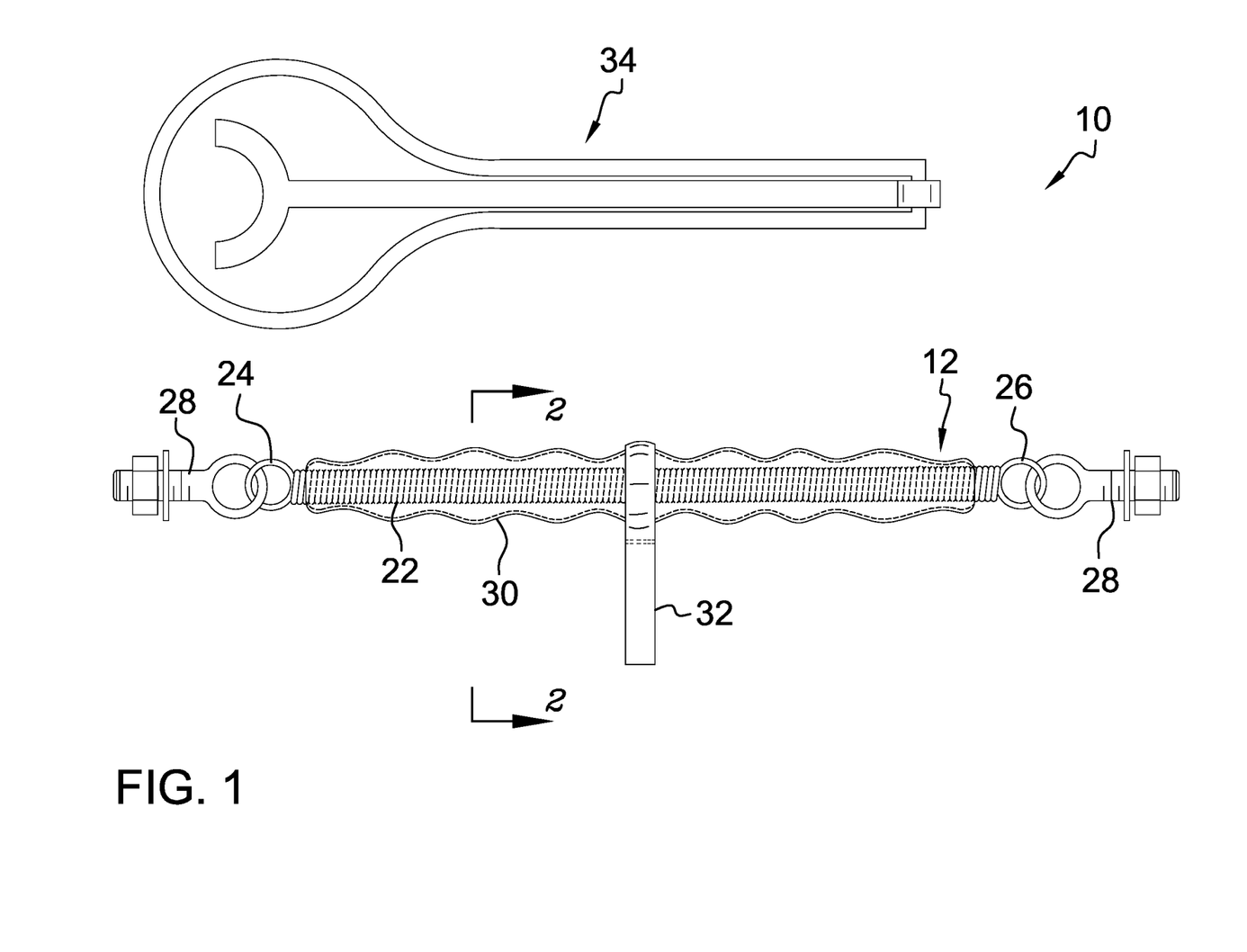
FIG. 1 is a perspective view of a first retainer or a fuel nozzle retainer kit according to an embodiment of the disclosure.
Figure 2:
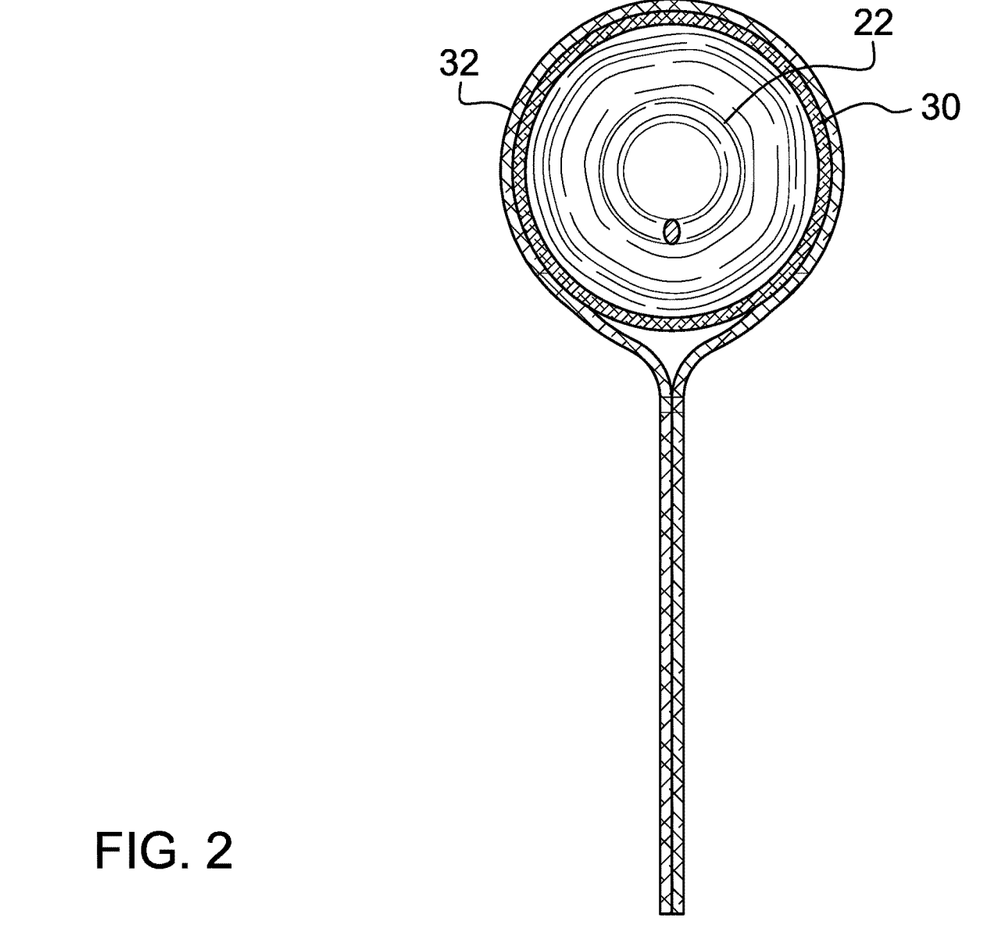
FIG. 2 is a cross sectional view taken along line 2-2 of FIG. 1 of a first retainer of an embodiment of the disclosure.
Figure 3:
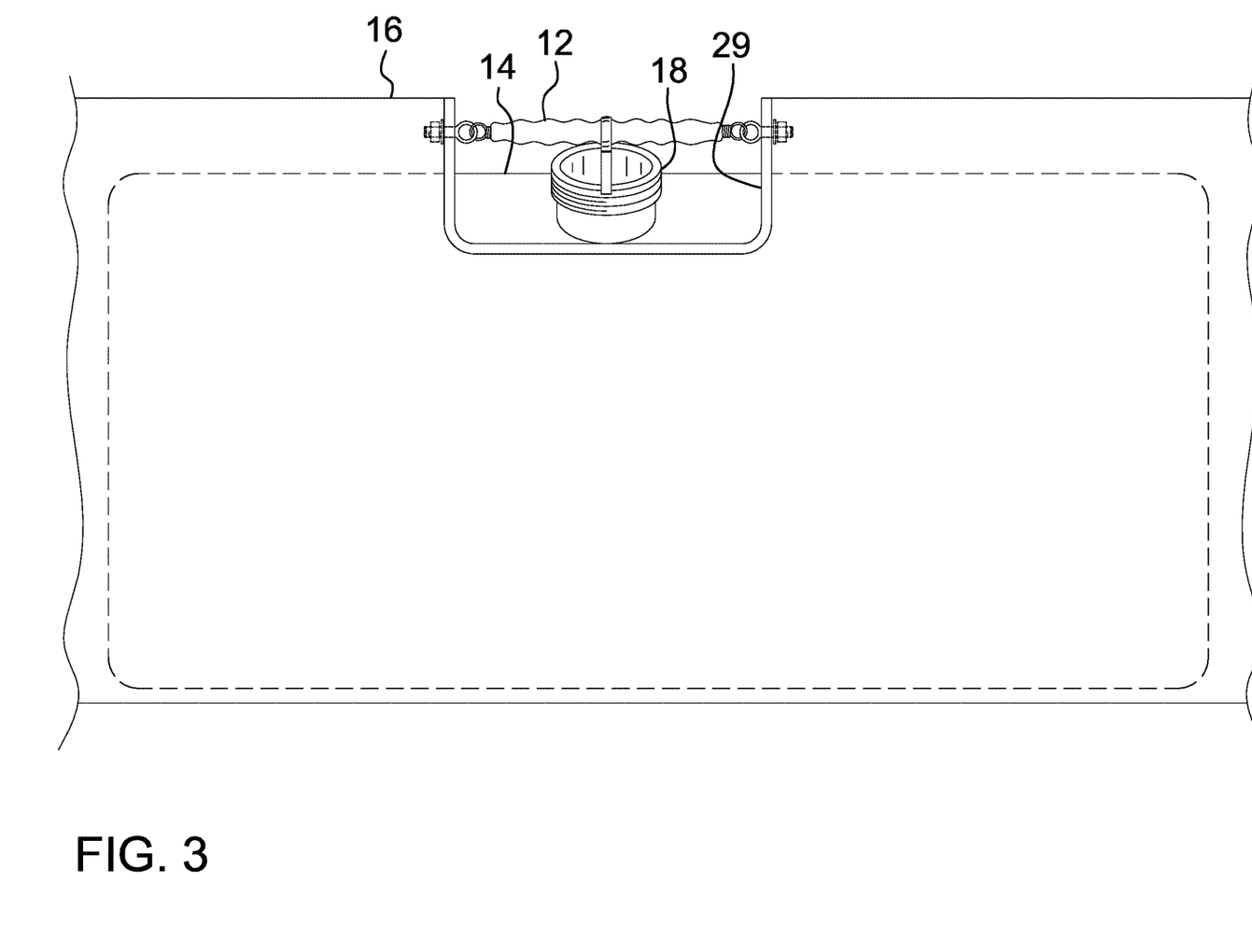
FIG. 3 is a perspective view of a first retainer of an embodiment of the disclosure being mounted to a skirt on a fuel tank.

The first retainer 12 includes a sleeve 30 that is positioned around the biasing member 22. The sleeve 30 is comprised of a resilient material, including but not being limited to canvas, to protect the biasing member 22 from abrasion. The sleeve 30 extends between the first end 24 and the second end 26. The first retainer 12 includes a grip 32 that is coupled to and extends away from the sleeve 30. The grip 32 can be gripped by a user for stretching the biasing member 22 over the fuel nozzle 20.

The grip 32 is centrally positioned between the first end 24 and the second end 26 of the biasing member 22. Additionally, the grip 32 extends along a line that is oriented perpendicular to a line extending between the first end 24 and the second end 26 of the biasing member 22. The grip 32 may comprise a loop that is wrapped around the sleeve 30 and is stitched to the sleeve 30.

A second retainer 34 is provided that is attachable to a fuel tank 14 that does not have a skirt 16 thereon. The second retainer 34 has a first portion 36 that is mountable around a fill port 18 of the fuel tank 14 that does not have a skirt 16. The second retainer 34 has a second portion 38 that is pivotally coupled to the first portion 36. The second portion 38 is positionable to engage a fuel nozzle 20 inserted into the fill port 18. In this way the second retainer 34 can retain the fuel nozzle 20 in the fill port 18.

The first portion 36 has a pair of legs 40 that are spaced apart from each other and a rounded section 42 extending between each of the legs 40. The legs 40 are oriented collinear with each other and each of the legs 40 has a distal end 44 with respect to the rounded section 42. The rounded section 42 is positionable around the fill port 18 on the fuel tank 14 that does not have a skirt 16 having each of the legs 40 extending downwardly along the fuel tank 14 from the fill port 18. The second portion 38 has a stem 45 and a head 46, and the stem 45 has a distal end 48 with respect to the head 46. The distal end 48 of the stem 45 is pivotally coupled to an engagement point 50 that extends between the distal end 44 of each of the legs 40 of the first portion 36.

Figures 7, 8:
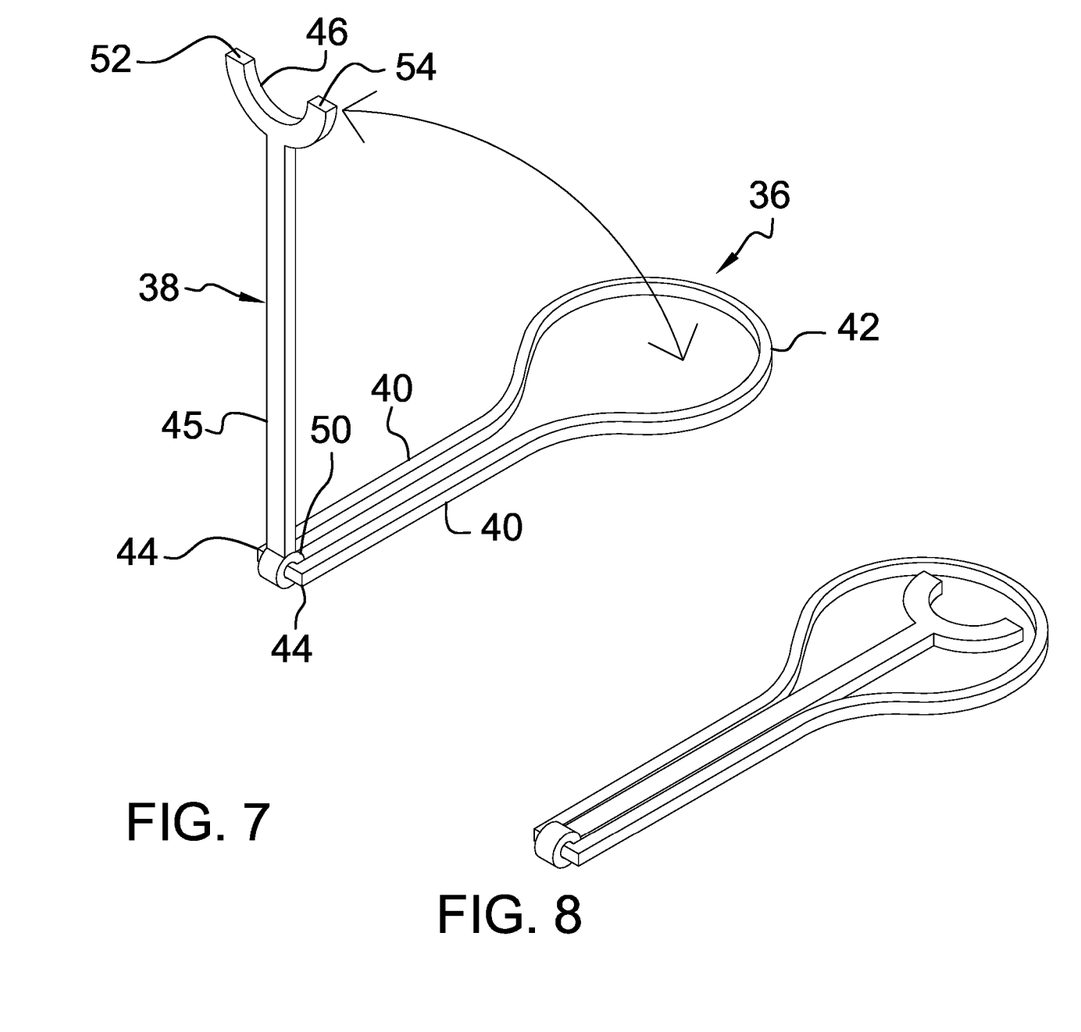
FIG. 7 is a perspective view of a second portion of a second retainer of an embodiment of the disclosure being positioned in a deployed position.
FIG. 8 is a perspective view of a second portion of a second retainer of an embodiment of the disclosure being positioned in a stowed position.
Figure 9:
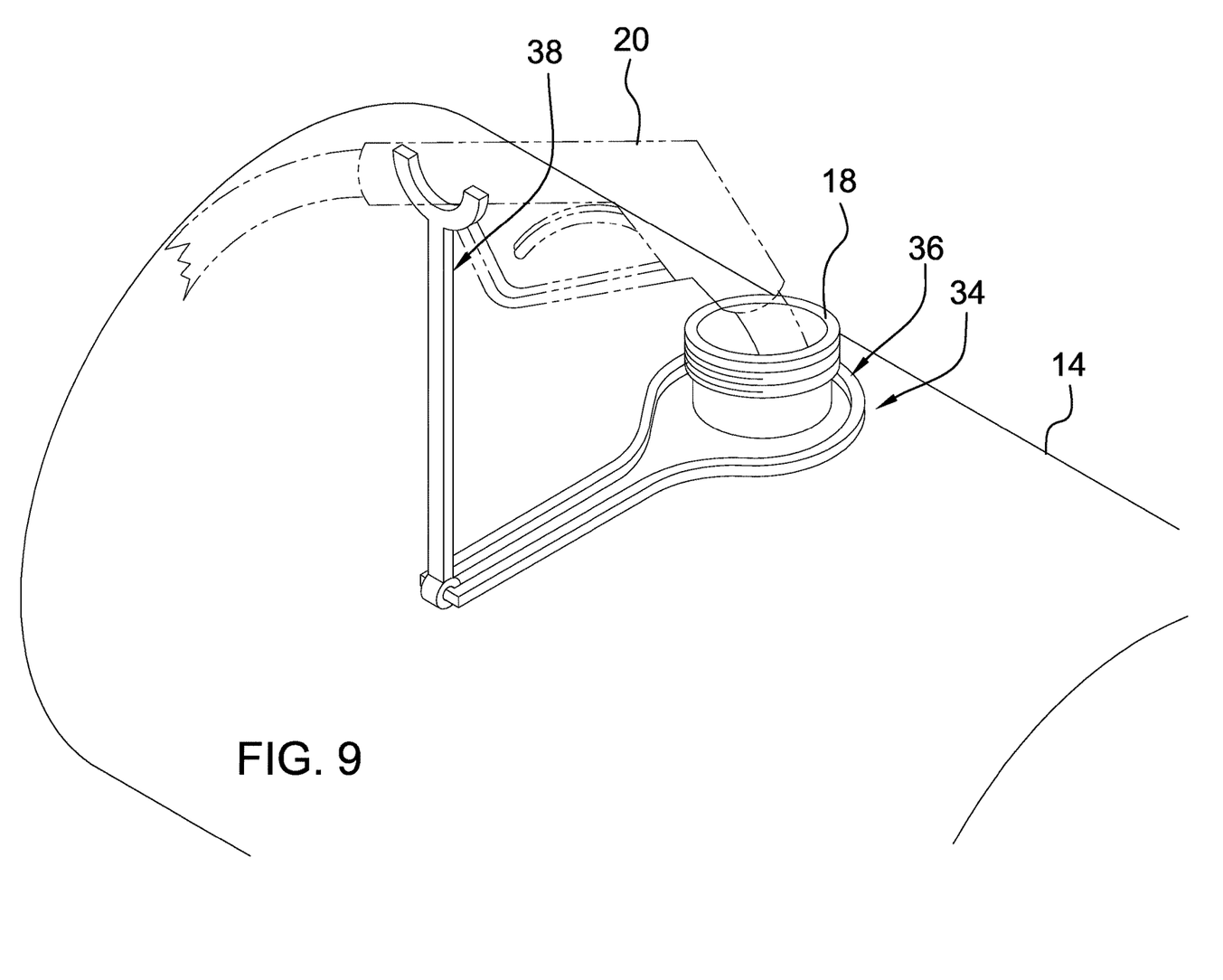
FIG. 9 is a perspective in-use view of a second retainer of an embodiment of the disclosure.

The head 46 has a primary end 52 and secondary end 54, and the head 46 is concavely arcuate between the primary end 52 and the secondary end 54. Moreover, the head 46 is oriented transverse to the stem 45 such that each of the primary end 52 and the secondary end 54 are directed away from the stem 45. The second portion 38 is positionable in a stowed position having the head 46 being surrounded by the rounded section 42 of the first portion 36. Additionally, the second portion 38 is positionable in a deployed position having the stem 45 extending outwardly from the fuel tank 14. In this way the head 46 can cradle the fuel nozzle 20 to inhibit the fuel nozzle 20 from falling out of the fill port 18.

Figure 4:
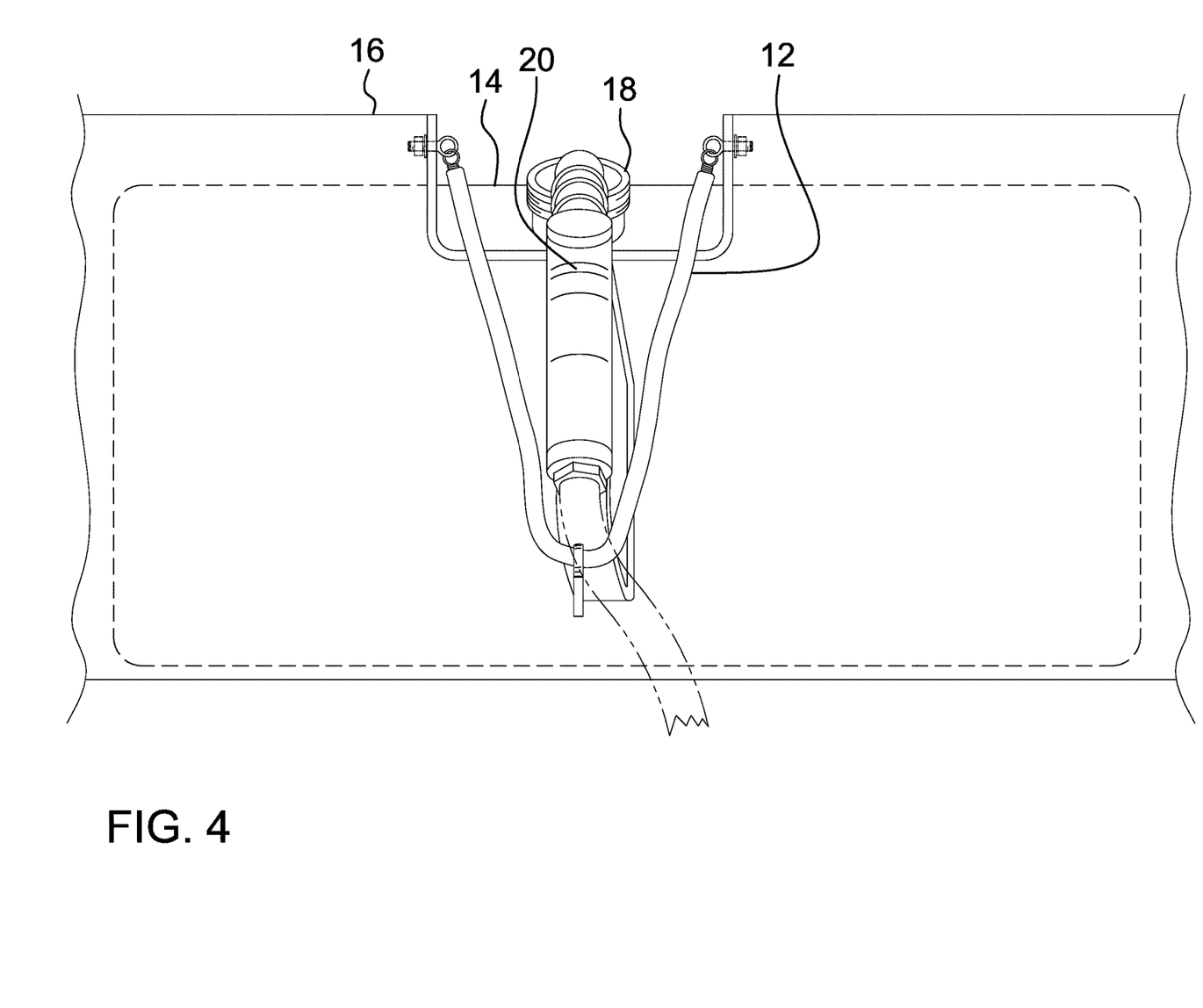
FIG. 4 is a perspective in-use view of a first retainer of an embodiment of the disclosure.
Figures 5, 6:
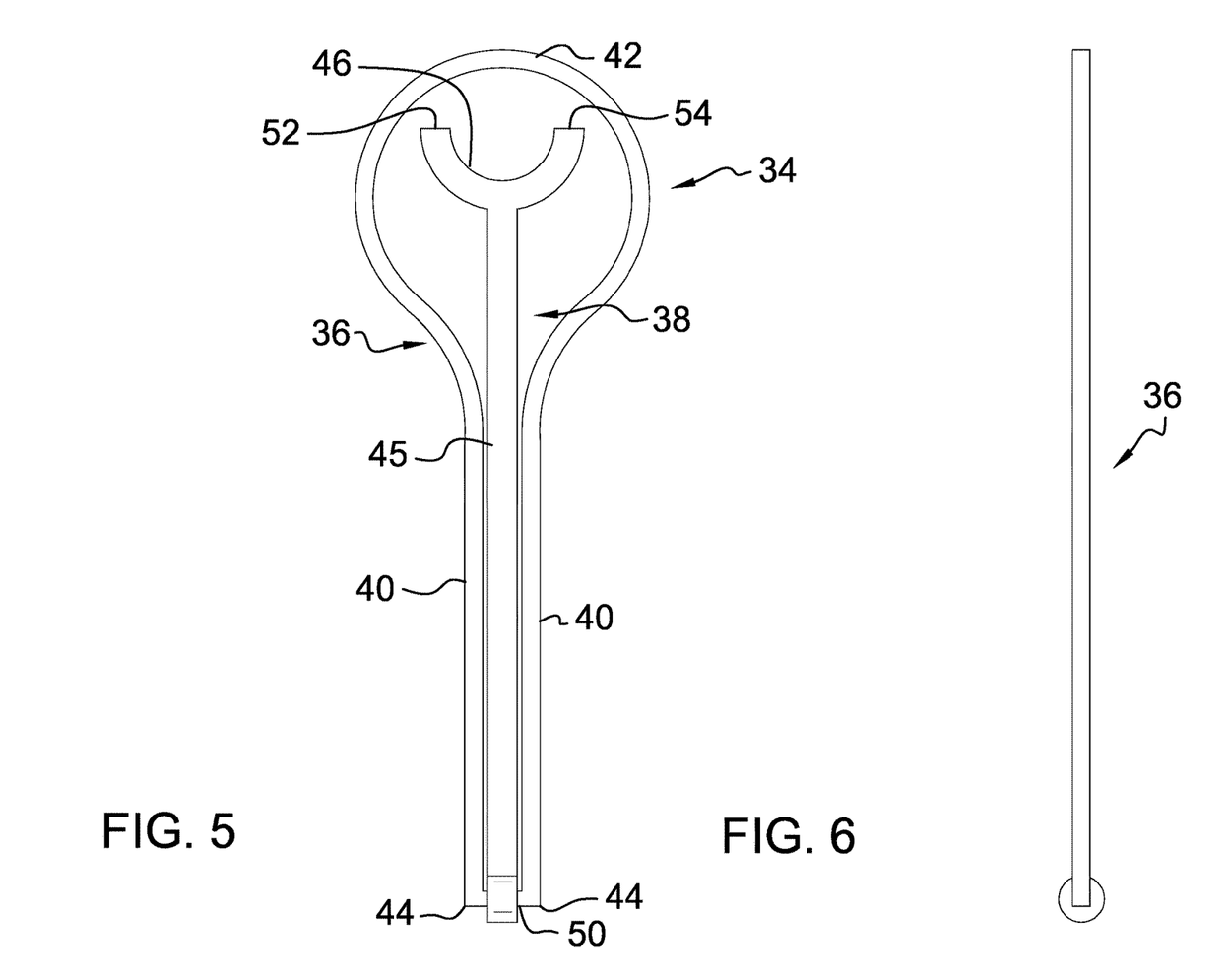
FIG. 5 is a top view of a second retainer of an embodiment of the disclosure.
FIG. 6 is a right side view of a second retainer of an embodiment of the disclosure.

In use, the first retainer 12 is attached to the skirt 16 on the fuel tank 14 such that the biasing member 22 extends across the fill port 18. The grip 32 is gripped and the biasing member 22 is stretched over the fuel nozzle 20 when the fuel nozzle 20 is inserted into the fill port 18. In this way the fuel nozzle 20 is inhibited from falling out of the fill port 18 during refueling procedures. The first portion 36 of the second retainer 34 is positioned around the fill port 18 on the fuel tank 14 that does not have a skirt 16. The second portion 38 of the second retainer 34 is positioned in the deployed position to support the fuel nozzle 20 when fuel nozzle 20 is inserted into the fill port 18. In this way the fuel nozzle 20 is inhibited from falling out of the fill port 18 during refueling procedures.

With respect to the above description then, it is to be realized that the optimum dimensional relationships for the parts of an embodiment enabled by the disclosure, to include variations in size, materials, shape, form, function and manner of operation, kit and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fuel nozzle retainer kit being configured to retain a fuel nozzle in a fill port of a fuel tank thereby inhibiting the fuel nozzle from falling out of the fill port, said kit comprising:

a first retainer being attachable to a fuel tank that has a skirt thereon, said first retainer extending over a fill port on the fuel tank, said first retainer having elastomeric properties wherein said first retainer is configured to engage and thus retain a fuel nozzle in the fuel port; and a second retainer being attachable to a fuel tank that does not have a skirt thereon, said second retainer having a first portion being mountable around a fill port of the fuel tank that does not have a skirt, said second retainer having a second portion being pivotally coupled to said first portion, said second portion being positionable to engage a fuel nozzle inserted into the fill port wherein said second retainer is configured to retain the fuel nozzle in the fill port, said first portion having a pair of legs being spaced apart from each other and a rounded section extending between each of said legs, each of said legs having a distal end with respect to said rounded section, said rounded section being positionable around the fill port on the fuel tank that does not have a skirt having each of said legs extending downwardly along the fuel tank from the fill port.

2. The kit according to claim 1, wherein said first retainer comprises a biasing member being attachable to a fuel tank having said biasing member extending over a fill port on the fuel tank wherein said biasing member is configured to be stretched over a fuel nozzle that is inserted into the fill port, said biasing member having a first end and a second end.

3. The kit according to claim 2, wherein said first retainer comprises a pair of couplers, each of said couplers being coupled to said biasing member, each of said couplers engaging a skirt on the fuel tank thereby facilitating said biasing member to be spaced outwardly from the fill port, each of said couplers being coupled to a respective one of said first end and said second end of said biasing member, each of said couplers engaging the skirt on the fuel tank on opposite sides of a cutout in the skirt that facilitates access to the fill port.

4. The kit according to claim 3, wherein said first retainer includes a sleeve being positioned around said biasing member, said sleeve being comprised of a resilient material to protect said biasing member from abrasion, said sleeve extending between said first end and said second end of said biasing member.

5. The kit according to claim 4, wherein said first retainer includes a grip being coupled to and extending away from said sleeve wherein said grip is configured to be gripped by a user for stretching said biasing member over the fuel nozzle, said grip is centrally positioned between said first end and said second end of said biasing member, said grip extending along a line being oriented perpendicular to a line extending between said first end and said second end of said biasing member.

6. The kit according to claim 1, wherein said second portion has a stem and a head, said stem having a distal end with respect to said head, said distal end of said stem being pivotally coupled to an engagement point extending between said distal end of each of said legs of said first portion, said head having a primary end and secondary end, said head being concavely arcuate between said primary end and said secondary end, said head being oriented transverse with said stem.

7. The assembly according to claim 6, wherein said second portion is positionable in a stowed position having said head being surrounded by said rounded section of said first portion.

8. The assembly according to claim 7, wherein said second portion is positionable in a deployed position having said stem extending outwardly from the fuel tank thereby facilitating said head to engage the fuel nozzle wherein said second portion is configured to inhibit the fuel nozzle from falling out of the fill port.

9. A fuel nozzle retainer kit being configured to retain a fuel nozzle in a fill port of a fuel tank thereby inhibiting the fuel nozzle from falling out of the fill port, said kit comprising:
a first retainer being attachable to a fuel tank that has a skirt thereon, said first retainer extending over a fill port on the fuel tank, said first retainer having elastomeric properties wherein said first retainer is configured to engage and thusly retain a fuel nozzle in the fuel port, said first retainer comprising:
a biasing member being attachable to a fuel tank having said biasing member extending over a fill port on the fuel tank wherein said biasing member is configured to be stretched over a fuel nozzle that is inserted into the fill port, said biasing member having a first end and a second end;
a pair of couplers, each of said couplers being coupled to said biasing member, each of said couplers engaging a skirt on the fuel tank thereby facilitating said biasing member to be spaced outwardly from the fill port, each of said couplers being coupled to a respective one of said first end and said second end of said biasing member, each of said couplers engaging the skirt on the fuel tank on opposite sides of a cutout in the skirt that facilitates access to the fill port;
a sleeve being positioned around said biasing member, said sleeve being comprised of a resilient material to protect said biasing member from abrasion, said sleeve extending between said first end and said second end; and
a grip being coupled to and extending away from said sleeve wherein said grip is configured to be gripped by a user for stretching said biasing member over the fuel nozzle, said grip being centrally positioned between said first end and said second end of said biasing member, said grip extending along a line being oriented perpendicular to a line extending between said first end and said second end of said biasing member; and
a second retainer being attachable to a fuel tank that does not have a skirt thereon, said second retainer having a first portion being mountable around a fill port of the fuel tank that does not have a skirt, said second retainer having a second portion being pivotally coupled to said first portion, said second portion being positionable to engage a fuel nozzle inserted into the fill port wherein said second retainer is configured to retain the fuel nozzle in the fill port, said first portion having a pair of legs being spaced apart from each other and a rounded section extending between each of said legs, each of said legs having a distal end with respect to said rounded section, said rounded section being positionable around the fill port on the fuel tank that does not have a skirt having each of said legs extending downwardly along the fuel tank from the fill port, said second portion having a stem and a head, said stem having a distal end with respect to said head, said distal end of said stem being pivotally coupled to an engagement point extending between said distal end of each of said legs of said first portion, said head having a primary end and secondary end, said head being concavely arcuate between said primary end and said secondary end, said head being oriented transverse to said stem, said second portion being positionable in a stowed position having said head being surrounded by said rounded section of said first portion, said second portion being positionable in a deployed position having said stem extending outwardly from the fuel tank thereby facilitating said head to engage the fuel nozzle wherein said second portion is configured to inhibit the fuel nozzle from falling out of the fill port.

* * * * *